United States Patent [19]

Tsuji et al.

[11] 3,959,406

[45] May 25, 1976

[54] POLYELECTROLYTE COMPOSITE OF POLYVINYL ALCOHOL DERIVATIVES

[75] Inventors: Waichiro Tsuji, Kyoto; Akio Nakajima, Ikeda; Masao Hosono, Hirakata, all of Japan

[73] Assignee: Kyoto University, Kyoto, Japan

[22] Filed: Feb. 15, 1974

[21] Appl. No.: 443,095

[30] Foreign Application Priority Data
June 12, 1973 Japan.............................. 48-066004

[52] U.S. Cl.................................. 260/874; 264/185; 526/9; 526/11
[51] Int. Cl.²...................... C08L 29/04; D01F 6/14
[58] Field of Search..................... 260/874, 91.3 VA

[56] References Cited
UNITED STATES PATENTS

| | | | |
|---|---|---|---|
| 2,992,204 | 7/1961 | Osugi et al. | 260/874 |
| 3,043,698 | 7/1962 | Chambers | 260/91.3 VA |
| 3,100,199 | 8/1963 | Fordham et al. | 260/91.3 VA |
| 3,142,532 | 7/1964 | Fukushima et al. | 260/874 |
| 3,211,685 | 10/1965 | Fukushima et al. | 260/874 |
| 3,365,408 | 1/1968 | Ohara | 260/91.3 VA |
| 3,477,995 | 11/1969 | Negoro et al. | 260/91.3 VA |

FOREIGN PATENTS OR APPLICATIONS

| | | | |
|---|---|---|---|
| 984,631 | 3/1965 | United Kingdom | 260/874 |

*Primary Examiner*—Murray Tillman
*Assistant Examiner*—Thurman K. Page
*Attorney, Agent, or Firm*—Oblon, Fisher, Spivak, McClelland & Maier

[57] ABSTRACT

A polyelectrolyte composite of polyvinyl alcohol derivatives; which comprises: an ionically bonded composite of a partial acetal of polyvinyl alcohol modified with diethoxyethyl trimethyl ammonium ion or a partial aminoacetal of polyvinyl alcohol modified with aminoacetal, with a carboxymethyl polyvinyl alcohol or a partial sulfate of polyvinyl alcohol.

3 Claims, No Drawings

# POLYELECTROLYTE COMPOSITE OF POLYVINYL ALCOHOL DERIVATIVES

BACKGROUND OF THE INVENTION

1. Field of the Invention

The present invention relates to a novel polyelectrolyte composite of polyvinyl alcohol derivatives and a membrane and fibers thereof. More particularly, the invention relates to polyelectrolyte composites prepared by the ionic cross-linking of two types of modified polyvinyl alcohols which have been respectively modified with a positive and a negative ionic group on each polyvinyl alcohol body structure under specific reaction conditions.

2. Description of the Prior Art

Heretofore, it has been known to use a polyelectrolyte composite of a gel and gum arabi for the preparation of microcapsules. It has also been known to use a polyelectrolyte composite of a protein and polymethacrylic acid or a methacrylic acid-vinylpyridine copolymer, for the separation of different proteins. Recently, polyelectrolyte composites of a polyvinylbenzyltrimethyl ammonium-polystyrene sulfonate salt and a polydiallyldimethyl ammonium-polystyrenesulfonate salt which are used in industrial applications and medical applications such as dialysis membranes, moisture breathing plastics, battery separators, contact lenses, artificial blood vessels and the like, have been prepared (Industrial and Engineering Chemistry, 57 Page 32 (1965) and Journal Macromolecular Science Chemistry, A4 Page 675 (1970)). Also, polyelectrolyte composites of a partial sulfate of polyvinyl alcohol-polyaminoacetal and a partial sulfate of polyvinyl alcoholpolyvinylpyridinium have been prepared. In addition, a mixture of two types of the polyelectrolytes wherein the formation of a composite of the polyelectrolytes is inhibited by a system of water and a salt NaCl, NaBr, $CaCl_2$ and the like) have been prepared. When water is removed from the mixture, a membrane of a polyelectrolyte composite can be prepared. Further, when the mixture of the solutions of the polyelectrolytes is coated on a substrate by spraying or coating, products such as an antistatic product, an ultrafiltration membrane, and medical filters can be prepared (Bulletin of the Institute for Chemical Research Kyoto University Vol. 47 Page 177 (1969)) (Biopolymers 11, 1345 (1972)) (Japanese Patent Application No. 21221/1971).

Polyelectrolyte composites prepared from modified polyvinyl alcohols has been previously prepared, wherein an aminoacetal compound and a urethane compound have been used as the cation substituents. However, the modification of strongly basic polyvinyl alcohols with diethoxy trimethyl ammonium ion previously has not been considered. Sulfates of polyvinyl alcohol, nitrates of polyvinyl alcohol and glyoxyl oxides of polyvinyl alcohol have been used as the anionic substituents. However, carboxymethyl polyvinyl alcohols have also not been considered as polyelectrolytes.

A need continues to exist for polyelectrolyte composites of polyvinyl alcohol derivatives which are soft, heat stable and not deformable in boiling water.

SUMMARY OF THE INVENTION

Accordingly, one object of the invention is to provide a polyelectrolyte composite of polyvinyl alcohol derivatives which is soft and heat stable and which has high strength and high water resistance when dry or wet.

Another object of the invention is to provide a polyelectrolyte composite of polyvinyl alcohol derivatives which is not deformed in boiling water.

Yet another object of the invention is to provide a membrane or a fiber of a polyelectrolyte composite useful for various applications such as in microcapsules, dialysis membranes, moisture breathing plastics, medical products and wash and wear fibers.

Briefly, these objects and other objects of the invention as hereinafter will become more readily apparent can be attained by a polyelectrolyte composite of a partial acetal of polyvinyl alcohol modified with diethoxyethyl trimethyl ammonium ion or a partial aminoacetal of polyvinyl alcohol modified with aminoacetal with a carboxymethyl polyvinyl alcohol or a partial sulfate of polyvinyl alcohol.

DETAILED DESCRIPTION OF THE PREFERRED EMBODIMENTS

In the present invention, a strongly basic polyelectrolyte prepared by modifying polyvinyl alcohol with diethoxyethyl trimethyl ammonium or a carboxymethyl polyvinyl alcohol prepared by modifying polyvinyl alcohol with monochloroacetic acid and ethanol, or a partial sulfate of polyvinyl alcohol and a partial aminoacetal of polyvinyl alcohol, are used by combining a positive polyelectrolyte with a negative polyelectrolyte in order to form a membrane or a fiber of the polyelectrolyte composite. The membrane or fiber of the polyelectrolyte composite is heat stable and water-resistant and is not dissolved when dipped in boiling water for a long time. Because residual amounts of salt which remain in the polyelectrolyte composite are removed as much as possible (that is to promote ionic cross-linkage between the polyelectrolytes), the composites are not deformed in boiling water even though the charge density is low, they have high strength. These characteristics can be improved by a heat treatment. When dry, the composites are soft, and thus can suitably be used in such industrial applications as microcapsules, dialysis membranes, moisture breathing plastics and medical products.

Because polyvinyl alcohol is a water soluble polymer, it is necessary to impart water resistance to the polymer when it is used as a membrane or as fibers by certain chemical or mechanical treatment. These modes of treatment, however, can be minimized by the process of the present invention. The polyelectrolyte composite exhibits the properties of a cross-linked polyvinyl alcohol so that the Young's modulus is improved, and high wash and wear properties can be expected when the composite is used as a fiber. Moreover, because the chemical structure of the composite has an affinity for dyes, the dying properties are improved.

The polyelectrolyte composite of polyvinyl alcohol derivatives and membranes and fibers formed from the same of the present invention are prepared by ionic cross-linking of two types of modified polyvinyl alcohols which have respectively a positive and a negative ionic group on each polyvinyl alcohol structural unit.

Hereinafter, the components of the modified polyvinyl alcohols are illustrated followed by a description of the preparation of the membrane and the fibers.

Starting Materials for the Polyelectrolytes

A partial acetal of polyvinylalcohol(hereinafter referred to as Component I) having the following formula can be prepared by reacting diethoxyethyltrimethyl ammonium ion, which is prepared by the reaction of diaminoacetal and methyliodide, with polyvinyl alcohol at 40°–90°C in the presence of hydrochloric acid as a catalyst.

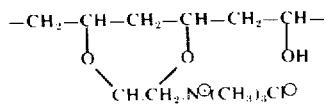

A partial carboxymethyl polyvinyl alcohol(hereinafter referred to as Component II) having the following formula can be prepared by heating polyvinyl alcohol with a mixture of sodium hydroxide and monochloroacetate or with a mixture of sodium hydroxide, monochloroacetate and ethanol.

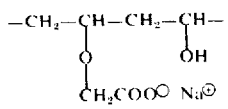

A partial sulfate of polyvinyl alcohol(hereinafter referred to as Component III) having the following formula can be prepared by sulfonating polyvinyl alcohol. For example, polyvinyl alcohol is added to 80% concentrated sulfuric acid and reacted at 0° – 10°C.

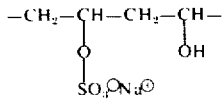

A partial aminoacetal of polyvinyl alcohol (hereinafter referred to as Component IV) having the following formula can be prepared by reacting polyvinylalcohol with aminoacetal at 40° – 90°C in the presence of hydrochloric acid.

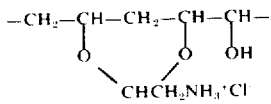

A Polyelectrolyte Composite and Membrane and Fiber Thereof Prepared From Components I and III A polyelectrolyte composite prepared from Component I and Component III (hereinafter referred to as PEC I) is a composite having the following ionic bonding structure:

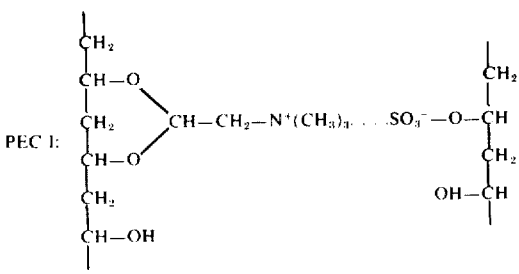

PEC I can be dissolved in a system of water and a salt such as NaCl, NaBr, CaCl$_2$, and the like or a system of water and an organic solvent such as dimethyl sulfoxide, dimethylformamide, dimethyl acetoamide and the like and a salt. Membranes or fibers of the polyelectrolyte composites can then be prepared by removing water, the organic solvent and the salt from the solution. If amounts of a low molecular weight salt remain in the resulting membrane or fiber structure, the ionic cross-linkage of the composite is suppressed which results in poor characteristics for the polyelectrolyte composite. When a system of water, an organic solvent and a salt is used the solvent medium, the amount of salt in the solution can be decreased which results in decreased amounts of the salt in the membrane or fiber by a more easily performed desalting operation. When the charge densities of Component I and Component III are relatively low, the polyelectrolyte composite is formed by mixing both aqueous solutions of Component I and Component III which forms an aqueous phase containing low concentrations of the product and an oil drop or gel phase containing high concentrations of the product. The concentrated oil drop or gel form of the polyelectrolyte compound is molded at room temperature or a higher temperature and is further concentrated and dried to prepare a membrane or a fiber. It is unnecessary to inhibit the formation of the composite by adding a salt or a mixture of a salt and an organic solvent in this instance.

The membrane or the fiber of the PEC I prepared by this process is soft and heat stable, and has high strength and high water-resistance when dry or wet and is not dissolved in boiling water. When the membrane or fiber is treated at 100° – 250°C it will not be deformed when placed in boiling water for long periods of time.

Polyvinyl alcohol is a water soluble polymer. Accordingly, in order that membranes and fibers derived from polyvinyl alcohol be used in various industrial applications, the polymers must be treated in order to become water resistant. Various modifications of polyvinyl alcohol have previously been proposed to overcome the solubility problem. However, the composites of the present invention have eliminated this problem to an appreciable extent. The ionic groups which form the ionic cross-linking structure of PEC I are strongly basic groups and strongly acidic groups which stabilize the PEC under acidic or alkaline conditions.

Polyelectrolyte Composite and Membrane and Fiber Thereof Prepared From Components I and II A polyelectrolyte composite prepared from Component I and Component II (hereinafter referred to as PEC II) is a composite having the following ionic bonding structure:

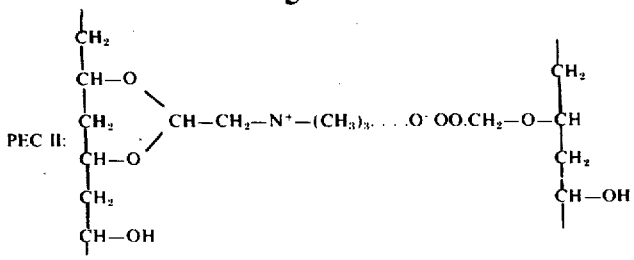

The formation of the polyelectrolyte composite (PEC (II)) is usually suppressed in acidic conditions, especially at a pH less than 3. This is dependent upon the charge densities of Component I and Component II. Membranes and fibers of the composite can be prepared by utilizing these characteristics. Even if the pH is greater than 3, PEC II can be obtained from an aqueous solution of a mixture of Component I and Component II as a concentrated oil drop or gel. The product can be molded at room temperature or a higher temperature and then is dried to prepare a membrane or fiber product thereof. PEC II can be dissolved in a system of water and a salt or a system of water, a salt and an organic solvent. Accordingly, it is possible to prepare a membrane and a fiber by utilizing this property. The membrane and the fiber of PEC II prepared by this process is soft and heat stable, and has high strength and high water-resistance under dry and wet conditions.

Polyelectrolyte Composite and Membrane and Fiber Thereof Prepared from Components II and IV A polyelectrolyte composite prepared from Component II and Component IV (hereinafter referred to as PEC III) is a composite having the following ionic bonding structure:

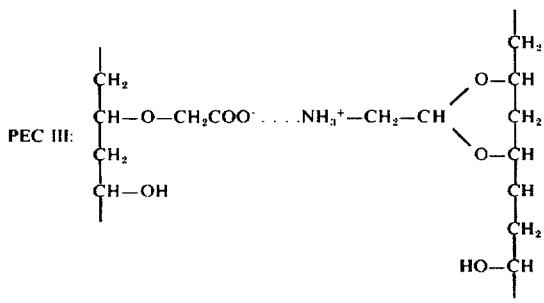

The formation of the polyelectrolyte composite (PEC III) is usually suppressed on the acidic side and on the alkaline side except for the pH range of 4 to 8, depending upon the charge densities of Components II and IV. Membranes and fibers of the composite can be prepared by utilizing this characteristic. Even if the pH is between 4 to 8, PEC III can be obtained from an aqueous solution of a mixture of the Components as a concentrated oil drop or gel. The product can be molded at room temperature or a higher temperature, and then is dried to prepare a membrane or fiber therefrom. PEC III can be dissolved in a system of water and a salt or a system of water, a salt and an organic solvent. Accordingly, it is possible to prepare a membrane and a fiber by utilizing this property. The membrane and the fiber of PEC III prepared by this process is soft and heat stable and has high strength and high water-resistance under both dry and wet conditions, and is not dissolved or deformed in boiling water. When it is treated at 100° - 250°C, water absorption is further decreased.

Polyvinyl alcohol is a water soluble polymer and accordingly, in order to industrially utilize it as a membrane or a fiber, it is necessary to impart water-resistance to the polymer. This has in the past required various types of processing. With the composites of the present invention such processing can be advantageously minimized.

Having generally described the invention, a more complete understanding can be attained by reference to certain specific examples which are provided herein for purpose of illustration only and are not intended to be limiting unless otherwise specified.

EXAMPLE 1

Preparation of a Membrane of PEC I Formed by Components I and III

Component I

A 150 g amount of diethoxyethyltrimethyl ammonium iodide formed by the reaction of methyl iodide with diaminoacetal at 0°C, 1320 ml of hydrochloric acid, and 3480 ml of water were added to 50 g of polyvinyl alcohol. The mixture was heated at 70°C for 25 hours and then neutralized with sodium bicarbonate. Thereafter, the solution was dialyzed with flowing water for several days in order to remove low molecular weight compounds. After the dialysis, the product was purified by an ion-exchange resin. The amount of acetal incorporated in the resulting Component I was 13.0 mole percent and the yield was 95%.

Component III

A quantity of powdery polyvinyl alcohol was added to 80% sulfuric acid at 0°C with vigorous stirring. Then, the mixture was reacted for 50 minutes. After the reaction, the reaction mixture was neutralized with sodium bicarbonate and was dialyzed with flowing water for several days. After the dialysis, the product was further purified through an ion-exchange resin. The sulfation rate of the resulting Component III was 5.7 mole percent and the yield was 78%.

Preparation of a Membrane of PEC I

About a 1% aqueous solution of Component I (an acetal amount of 13.0 mole percent with a gegen ion of $OH^-$) was stoichiometrically added to about a 1% aqueous solution of Component III (a sulfation degree of 5.7 mole percent as the sodium salt) whereby a concentrated gel layer formed and was separated. The product was dried, dipped in methanol to remove sodium hydroxide and further dried to obtain a transparent membrane of the polyelectrolyte composite. The resulting membrane was swelled but did not dissolve in boiling water. The membrane was strecthed at 200°C to twice its original size, and was heat-treated at 200°C for 10 minutes. The resulting product was not deformed even when subjected to boiling water. The stretched membrane had a strength of 4.2 kg/mm$^2$, an elongation of 113% and a Young's modulus of 113 kg/mm$^2$ at 20°C at a specific humidity of 65%.

EXAMPLE 2

Preparation of a Fiber of PEC I

A mixture of 65% dimethylsulfoxide, 2.2 % NaCl and 32.8% water was used as a solvent to prepare a 15% solution of Component I (an acetal amount of 13.7 mole percent with a gegen ion of OH$^-$) and a 15% solution of Component III (a sulfation degree of 5.7 mole percent as the sodium salt). Stoichiometric amounts of both of the solutions were mixed and extruded into a 30% aqueous solution of sodium sulfate at 40°C whereby a fiber of polyelectrolyte composite PEC I was obtained.

EXAMPLE 3

Preparation of a Membrane of PEC III

Component II

A 200 g amount of sodium hydroxide, 400 ml of ethanol, and 400 ml of water were added to 50 g of polyvinyl alcohol. To the mixture was added 400 g of sodium monochloroacetate at 10°C, and the mixture was heated to 70°C for 7 hours. Thereafter, the reaction mixture was neutralized with hydrochloric acid, and was dialyzed with flowing water for several days. After the dialysis, the product was purified through an ion-exchange resin. The etherification degree of the resulting Component II was 9.5 mole percent and the yield was 98%.

COMPONENT IV

A 37 ml amount of aminoacetal, 1320 ml of hydrochloric acid and 3480 ml of water were added to 50 g of polyvinyl alcohol, and the resulting mixture was heated at 70°C for 15 hours. The reaction mixture was neutralized with sodium bicarbonate and was dialyzed with a flowing water for several days in order to remove low molecular weight compounds. After the dialysis, the product was further purified through an ion-exchange resin. The acetal degree of the resulting component IV was 14.5 mole percent and the yield was 93%.

Preparation of a Membrane of PEC III

A 5% aqueous solution of Component II (an etherification degree of 9.5 mole percent) adjusted to a pH of 11 with sodium hydroxide was stoichiometrically added to a 5% aqueous solution of Component IV (an acetal degree of 14.5 mole percent) adjusted to a pH of 11 with sodium hydroxide. Under these conditions, no polyelectrolyte composite was formed. The mixture was molded and dried in order to prepare a membrane. The resulting membrane was dipped in methanol to remove sodium hydroxide whereby a transparent membrane of polyelectrolyte composite was obtained. The resulting polyelectrolyte membrane did not dissolve or deform in boiling water. The membrane was stretched at 200°C to 1.5 times its original size, and was heat-treated at 200°C for 10 minutes. The stretched membrane had a strength of 3.8 kg/mm$^2$, an elongation of 133% and a Young's modulus of 45 kg/mm$^2$ at 20°C in a specific humidity of 65%.

EXAMPLE 4

Preparation of a Fiber of PEC III

A 15% aqueous solution of Component III (an etherification degree of 9.5 mole percent as the sodium salt) was stoichiometrically added to a 15% aqueous solution of Compound IV (an acetal degree of 14.5 mole percent as the —NH$_2$ derivative). The combined aqueous solutions had a pH of 8.5, but a polyelectrolyte composite did not form as stated above. The mixture was extruded into a 30% aqueous solution of sodium sulfate having a pH of 3 to 6 whereby a fiber of polyelectrolyte composite PEC III was obtained.

Having now fully described the invention, it will be apparent to one of ordinary skill in the art that many changes and modifications can be made thereto without departing from the spirit or scope of the invention as set forth herein.

What is claimed as new and intended to be covered by Letters Patent of the United States is:

1. A polyelectrolyte composite which comprises a partial aminoacetal of polyvinyl alcohol having the repeating units of

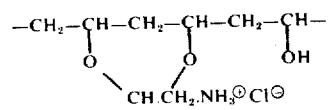

and a carboxymethyl polyvinyl alcohol having the repeating units of

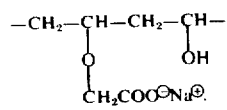

2. A membrane or a fiber of the polyelectrolyte composite of claim 1.

3. The polyelectrolyte composite of claim 1, wherein the partial aminoacetal of polyvinyl alcohol and the carboxymethyl polyvinyl alcohol are present in stoichiometric amounts.

* * * * *